United States Patent [19]

Lehman et al.

[11] Patent Number: 4,791,883
[45] Date of Patent: Dec. 20, 1988

[54] DISPOSABLE LITTER BOXES

[75] Inventors: Donald L. Lehman, 1341 Jefferson Blvd., Hagerstown, Md. 21740; Richard G. Lutzke, 9082 Tomstown Rd., Waynesboro, Pa. 17268; Robert W. Beichler, Jr., Baltimore, Md.

[73] Assignees: Donald L. Lehman, Hagerstown, Md.; Richard G. Lutzke, Waynesboro, Pa.

[21] Appl. No.: 30,381

[22] Filed: Mar. 26, 1987

[51] Int. Cl.[4] .................. B65D 5/54; A01K 29/00
[52] U.S. Cl. .................................. 119/1; 229/146
[58] Field of Search ............ 119/1; 229/101, 146, 229/178, 186

[56] References Cited

U.S. PATENT DOCUMENTS

| | | | |
|---|---|---|---|
| 1,726,682 | 9/1929 | Scholes | 229/178 X |
| 2,265,326 | 12/1941 | Stopper | 229/146 |
| 2,677,492 | 5/1954 | Buttery | 229/186 X |
| 2,914,234 | 11/1959 | Hazelwood | 229/146 X |
| 3,154,052 | 10/1964 | Sweeney | 119/1 |
| 3,581,975 | 6/1971 | Riccio | 119/1 X |
| 3,684,155 | 8/1972 | Smith | 119/1 X |
| 3,743,170 | 7/1973 | Riccio | 119/1 |
| 3,886,901 | 6/1975 | Zeitter | 119/1 |
| 3,990,396 | 11/1976 | Turk | 119/1 |
| 4,029,048 | 6/1977 | Gershbein | 119/1 |
| 4,305,544 | 12/1981 | Noonan | 119/1 X |
| 4,348,982 | 9/1982 | Selby | 119/1 X |
| 4,441,451 | 4/1984 | Neal | 119/1 |
| 4,452,367 | 6/1984 | Wein | 229/146 X |
| 4,548,160 | 10/1985 | Feitelson | 119/1 |
| 4,553,671 | 11/1985 | Cheesman | 229/23 |

Primary Examiner—Robert P. Swiatek
Attorney, Agent, or Firm—Dowell & Dowell

[57] ABSTRACT

Disposable litter boxes of the type for containing an absorbent material which are suitable for use as cat litter boxes or petroleum and other liquid waste containers wherein the boxes are foldable to create tray-like receptacles which include a bottom wall and upwardly extending ends and side walls which are continuously joined with the bottom wall so that no openings are created therebetween. The receptacles contain an absorbent material which when used may be selectively enclosed for disposal within a closed box created by folding the opposing end walls of the tray into overlapping configuration. The boxes may be sold or shipped in either a flat or folded configuration, and when folded may be sold with an absorbent material already packaged therein.

17 Claims, 4 Drawing Sheets

DISPOSABLE LITTER BOXES

BACKGROUND OF THE INVENTION

1. Field of the Invention

This invention is generally directed to disposable litter boxes of the type used for cat litter boxes or for waste oil disposal boxes. Such litter boxes include a tray-like structure formed of a cardboard-like material in which an absorbent granular material is selectively placed. After the absorbent material has been utilized, the container is designed to be clasped around the absorbent material to encase the same for appropriate disposal. The present invention is more specifically directed to a foldable tray-like container for use as a disposable litter box which container may be folded upon itself in such a manner as to enclose the used absorbent material therein without any of the absorbent material or other waste therein passing or being forced from the container as it is folded. In addition, the container or box of the present invention is designed so that there are no openings which extend along the lines between the end and side walls of the box and the bottom of the box during use and thus, no liquid or particulate material may pass therebetween. The invention is also specifically directed to the concept of creating a blank cardboard-like or other material which may be selectively initially folded either by a manufacturer or consumer so as to assume the tray-like configuration of a litter box which litter box can be subsequently folded into an enclosed container for disposal of the material within the box.

2. History of the Art

Disposable litter boxes or containers of the type to which the present invention is generally directed have found their greatest utility in the sanitary handling and care of household pets. Particularly, such disposable containers have been primarily used as disposable litter boxes which facilitate the sanitary disposal of cat waste without requiring the pet owner to transfer or handle the waste by transferring it from a reusable container to some type of disposable receptacle.

To further facilitate consumer acceptance of the concept of disposable litter boxes, many disposable litter boxes have been designed to be initially retailed containing the absorbent material which is to be place therein. In this manner, the disposable box and litter material is purchased by the consumer as a unit, utilized as a unit and thereafter disposed of as a unit. Such simplistic handling not only offers advantages to people in home environments but also makes it possible to utilize such disposable containers when traveling with pets.

In more recent years, the same general concept has been utilized with the disposal of waste oil which has been drained from an automobile or similar type vehicle. When changing automobile oil, the old oil must be drained from the engine block and thereafter placed in some type of containers for subsequent disposal. Such an operation has historically been somewhat messy. It has therefore been proposed to utilize an absorbent granular material which is contained in a disposable tray which may be placed underneath the vehicle to receive the motor oil being drained therefrom. In this manner, once the oil is drained from the vehicle, the disposable container is closed and subsequently discarded in a more conventional waste receptacle with the liquid being retained in the absorbent material.

In U.S. Pat. No. 3,154,052 to Sweeney, an early form of disposable litter tray or box is disclosed wherein the absorbent material used with the tray is prepackaged in a box form with the tray so that upon opening of the box, the absorbent material may be spread and used as a litter box for pets in the conventional manner. After the absorbent material has been utilized, the patent discloses that the tray receptacle may be folded so as to house the waste absorbent material therein. The patent also discloses the concept of coating the box or tray structure with a moisture barrier material to prevent the cardboard or other paper-like material from which the product is made from becoming dampened or deteriorated by exposure to liquids associated with the use of the box.

Unfortunately, the container disclosed in the Sweeney patent, has been found to be not entirely satisfactory for consumer use. Specifically, structures such as that disclosed in the Sweeney patent, are designed in such a manner that it is possible for the litter material, and therefore, the waste material which is being absorbed by the litter to escape or pass through various points between the sides, ends and bottom walls of the tray when the tray is in use. Particularly, the structures of many prior art disposable pet litter boxes are such that the granular absorbent litter material may pass through openings formed at the corners of the boxes or between seams formed on the sides or end walls of the boxes. Such receptacles permit contaminated waste absorbent material to escape from the box requiring further clean-up by the consumer. In addition to the foregoing, although the patent to Sweeney discloses that the container may be closed upon itself in order to house the used absorbent material and other wastes therein, in actual practice, the container binds upon itself or upon the waste material which is housed therein during the closing process. The side walls do not permit a complete closure of the box. With the Sweeney structure, it is necessary to insert a tool or other instrument within the box during the closing process in order to move the litter or other absorbent material away from the collapsing side walls thereof so that the side walls may be completely folded as indicated in the patent. Such handling of the waste material within the box during the closing process is completely undesirable and presents an unsanitary situation which is unacceptable to the consumer.

In U.S. Pat. No. 4,548,160 to Feitelson, another disposable cat litter box is disclosed which utilizes a more complicated assembling and folding structure for the disposable container. The more complicated the assembly of the box, the less desirable the box is to a consumer. In addition, with the structure disclosed in Feitelson, the collapsing of the container requires manual manipulation of portions of the container adjacent the contaminated absorbent material or litter contained therein. Many consumers will not want to adjust the side walls of the box in order to collapse the box if they have to insert their hands within the interior of the container where the container has been subject to contamination.

In U.S. Pat. No. 3,886,901 to Zeitter, another type of foldable cat litter box is disclosed wherein the absorbent material is originally packaged with the disposable tray. In the structure disclosed, however, once the box has been opened by removing the central tear strip therefrom, the box cannot be adequately folded upon itself in such a manner as to tightly enclose the materials which have been used and have become contaminated.

Other types of prior art disposable cat litter boxes which are constructed to be utilized in a tray-like configuration and then folded for disposal are also specifically designed to be utilized with a separate liner which is inserted in the tray before any absorbent material is introduced therein. The added requirement for a separate liner not only complicates the overall structure but requires the consumer to handle the different materials in a manner which can create spillage relative to the litter tray. An example of a disposable container having a separate liner is found in U.S. Pat. No. 3,684,155 to Smith.

Additional examples of the prior art disposable litter boxes are disclosed in U.S. Pat. Nos. 3,581,975 to Riccio; 3,743,170 to Riccio; 4,305,544 to Noonan; 4,441,451 to Neal and 4,553,671 to Cheesman.

SUMMARY OF THE INVENTION

This invention is directed to a disposable litter box constructed of a cardboard, paperboard-like or other foldable material wherein the box is designed to contain an initial amount of an absorbent material such as cat or pet litter. The box is originally purchased by a consumer in a closed configuration housing a supply of absorbent material. The box is designed to be unfolded into a tray-like configuration whereafter the cat litter or other absorbent material is discharged from a separate container within the box and spread over the surface or bottom of the tray-like container. After the litter has been used, the box is designed to be folded upon itself with the end walls of the tray being simultaneously moved relative to one another to form overlapping upper portions of a closed box container in which the soiled or used absorbent material or litter will be retained The invention is also directed to the formation of a closable tray-like container which can be collapsed into a closed box configuration wherein the container or tray has no openings extending along the joints between the sides and end walls and the bottom wall of the tray through which any waste or absorbent material can pass. Each of the side walls includes a generally central section having space generally parallel and vertically extending fold lines which are each spaced inwardly from the respective corners of the tray-like container. Additional fold lines which may be created by perforating the box material extend diagonally from the bottom of the vertical fold lines toward the ends or corners of the tray-like structure and terminate at a point spaced just inwardly thereof along the upper edge of the side walls. In this manner, as the ends of the tray-like container are folded toward one another, the portions of the box between the diagonal fold lines and the vertical fold lines on each side of the box will fold outwardly automatically with respect to one another thereby permitting the end portions of the box to be raised relative to one another and closed into overlapping relationship with one another without the side walls interfering or engaging with the contents of the container. In this manner, the box can be folded without obstruction from the absorbent material or other waste material contained in the tray as the tray is closed into the box-like configuration.

In one embodiment of the invention, the container may be initially formed from a preformed sheet material. The sheet material which is generally rectangular configuration is preformed to create two longitudinal fold lines which are equally spaced inwardly from opposing side edges of the sheet material. Thereafter, a first set of transverse fold lines are created spaced inwardly of the end walls of the blank material so as to create fold lines which cross the two longitudinal fold lines. The corners of the box are formed by thereafter creating diagonal fold lines in each of the corner sections defined by the first transverse fold lines and the longitudinal fold lines. Thereafter, secondary diagonal fold lines are made extending upwardly and outwardly from adjacent the longitudinal fold lines to a point along the edge of the sheet material which is spaced slightly inwardly from the first transverse fold lines. The sheet material may be sold to a consumer in a sheet configuration with the corners thereof having a self-adhesive material applied thereto so that the box may be assembled into the rectangular tray configuration having side and end walls and a bottom wall which are generally continuously formed with respect to one another. The side walls of the tray will include an outwardly flaring intermediate section which permits the ends of the box to be folded or rolled into overlapping configuration with respect to one another to form the tray into a closed rectangular box configuration.

In another embodiment of the invention, additional end panels can be provided generally perpendicularly to and between the longitudinally extending parallel fold lines. Tabs may be provided on the additional panels which tabs can be inserted through slots provided in the body of the sheet material in order to faciliate the locking of the box in a folded configuration by the consumer.

It is a primary object of the present invention to provide a disposable litter container in which an absorbent material may be initially packaged for sale to the consumer and wherein the initial container or box is unfolded to create a usable container or tray in which the absorbent material is spread for use. After the absorbent material has been used, the tray is designed to be folded with the ends coming into overlapping relationship to form the upper surface of an enclose container without any material being spilled from the container or interfering with the closure of the box.

It is another object of the present invention to provide a container for ca litter and other absorbent type materials such as for absorbing oil or other waste products wherein the contents of the container may be handled in a more sanitary fashion than present containers as the box is designed to be unfolded and folded without interfering with the material contents thereof.

It is also an object of the present invention to provide a disposable box for use as a pet litter box or other absorbent material containing box wherein the box is used in a tray-like configuration with absorbent material spread evenly therein and which can be disposed of by closing the ends of the tray into overlapping relationship with respect to one another while simultaneously allowing the side walls of the tray to flare outwardly into a non-interfering relationship with the closure of the end walls so that the box can be closed without interference with the material contained therein.

It is another object of the present invention to provide a disposable box of the cat litter type wherein the box may be handled on the exterior during the opening and closing operations without requiring the consumer to use any tools to effect the opening or the closing and without requiring the hands of the consumer to penetrate the interior of the box during the opening or closing process.

A further object of the present invention is to provide boxes which can be folded as described above wherein the boxes may be manufactured as preformed blanks which may be sold to the consumer and assembled by the consumer in tray-like configurations in which separate cat litter or other absorbent material may be added. When disposal is necessary, the tray-like configuration can thereafter be folded into a disposable container in a like manner as discussed with respect to the preferred embodiment.

In another form of the present invention, the end walls of a disposable litter box are strengthened by reinforcing walls which carry separate tab means for locking the end walls to the side walls to rigidify the overall structure and to lock the walls into a tray-like configuration.

Another object of the present invention is to provide a foldable sheet-like cardboard or similar material which may be folded into a first tray-like configuration in which the tray can be utilized to house an absorbent material as the interior of the box is coated with a liquid resistant coating material and when desired, the tray can be folded upon itself into a closed configuration in a very easy closing motion without any material being spilled from the box during closing.

A further object of the present invention is to provide a disposable box structure for materials such as cat litter which can be constructed in a relatively simple and inexpensive manner when compared to prior art structures and thereby provide a product which is economical for the consumer to utilize and yet sanitary to handle.

DESCRIPTION OF THE PREFERRED EMBODIMENT

With continued reference to the drawings, two embodiments of the present invention are disclosed with one embodiment being shown in FIGS. 1–5 and a second embodiment in FIGS. 6–10.

Figure 1:
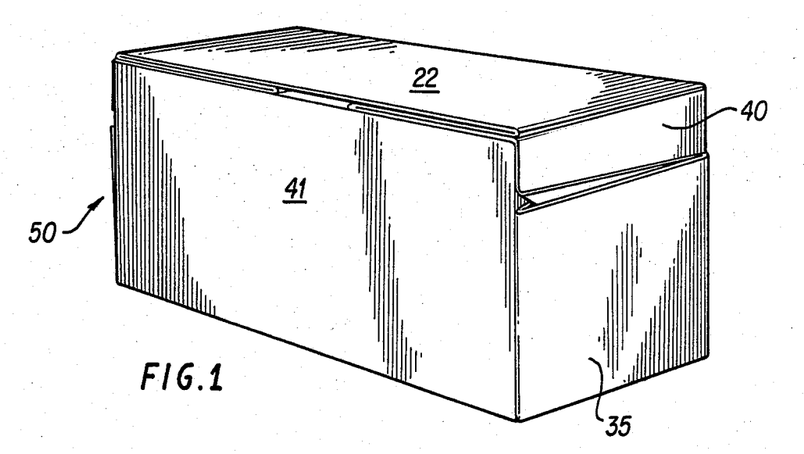
FIG. 1 is a perspective illustrational view of a closed disposable litter container formed in accordance with the teachings of the present invention.
Figure 2:
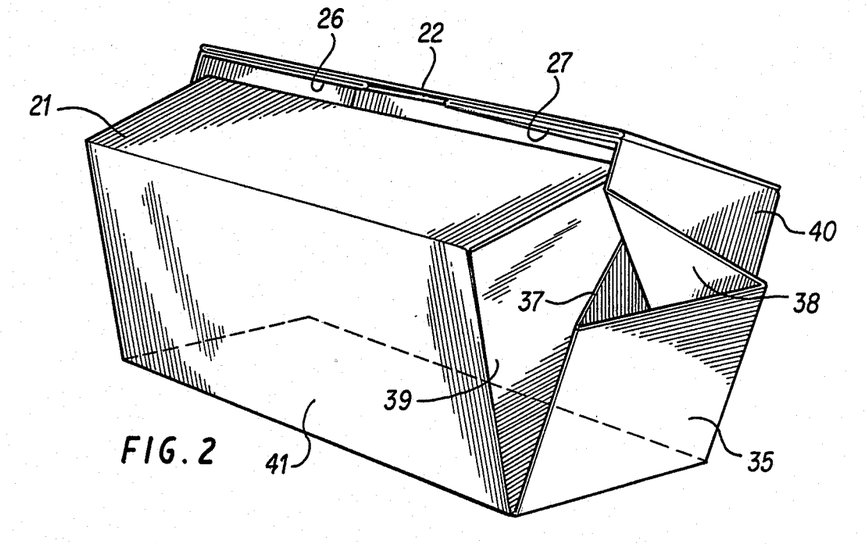
FIGS. 2–4 are perspective views illustrating the steps of opening and/or closing the box of FIG. 1 into an open tray-like configuration of FIG. 4 and reversely to close the box into the closed configuration of FIG. 1.
Figure 3:
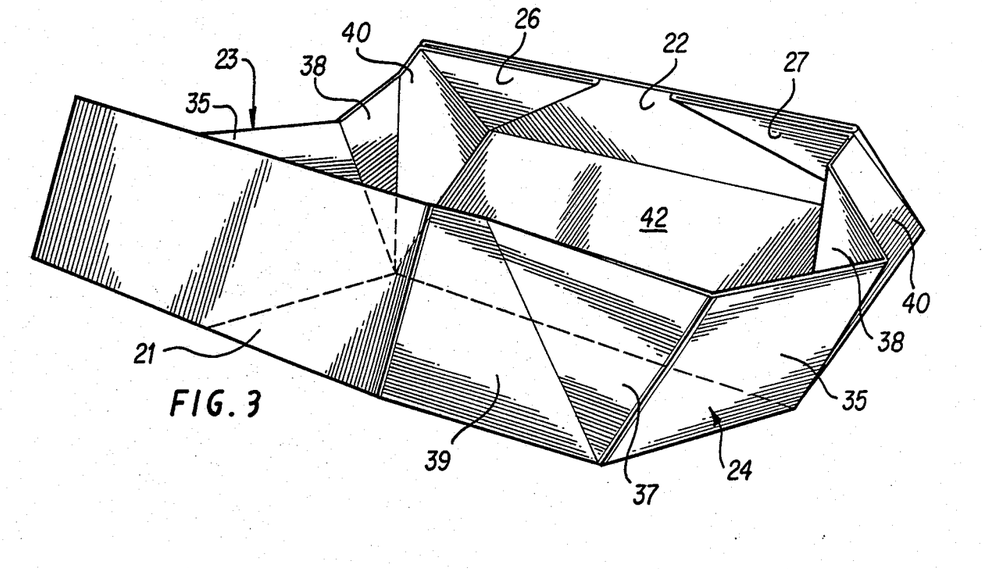

In the first embodiment, the disposable litter box 20 is shown in FIG. 1 as being assembled into a box-like configuration either for shipping to a consumer or as folded for disposal by the consumer. The various portions of the box-like container will be discussed as they relate to the tray-like configuration shown fully in FIG. 4 of the drawings as the box-like configuration of FIG. 1 is easily unfolded as illustrated in FIGS. 1–3 to create the disposable litter tray of FIG. 4 which is identified by numeral 20

Figure 4:
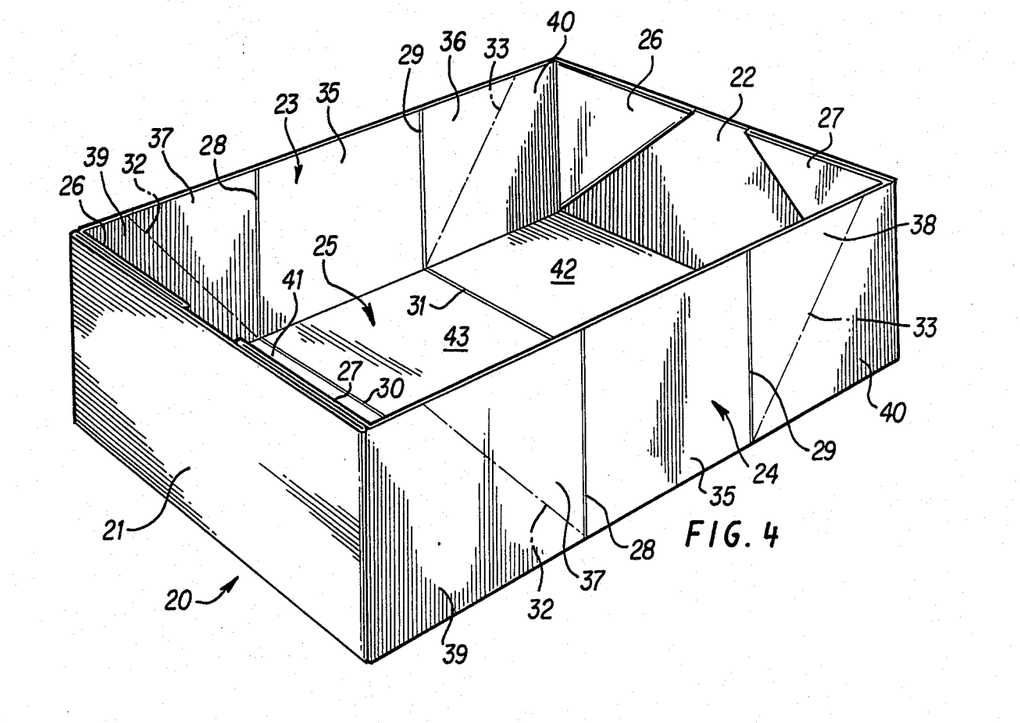

The disposable litter tray includes a pair of end walls 21 and 22, side walls 23 and 24 and a bottom wall 25. Each of the end walls 21 and 22 is reinforced in the area of the corners or junctions with the side walls 23 and 24 with generally rectangularly shaped secondary end wall portions 26 and 27. Each of the reinforcing sections 26 and 27 are formed from a generally square panel which has been folded over upon itself to create the triangular shape shown. The purpose for utilizing the reinforcing sections is not only to strengthen the area of the container adjacent the four corners thereof but also to insure that the container does not have any openings along the inner periphery between any of the side walls 23 and 24 or the end walls 21 and 22. Therefore, when the container is initially formed, after the panels have been folded to create the triangular reinforcing configuration, they are either glued, taped or stapled to the end walls 21 and 22.

The container is shown as being rectangular in configuration and is preferrably constructed of a cardboard material which may be corrugated or non-corrugated cardboard. In addition, the box may be constructed of a lighter weight material or even fabricated from some types of plastic materials. As the disposable tray 20 is to be utilized to contain absorbent material and as various liquids and water may be deposited within the container or tray, the inner surfaces of each of the ends, sides and bottom wall are coated with a water or liquid resistant material so that a moisture barrier is created within the container. Various types of coatings or sealers may be used as are conventionally available. Although not shown specifically in FIG. 4, a particulate material will normally be placed within the tray so as to provide a depth of material above the bottom of the tray 25. Such material may be conventional cat litter type material or may be a specialized liquid or petroleum absorbent.

The disposable trays 20 of the present invention are uniquely designed to be easily and readily foldable in such a manner that any material which is contained within the tray is maintained or trapped therein as the tray is folded to create the box shown in FIG. 1. In order to accomplish the folding of the tray without discharging any of the waste material, the side walls 23 and 24 and the bottom wall 25 have been provided with preformed fold lines. With continued reference to FIG. 4, each of the side walls include a pair of generally parallel primary fold lines indicated at 28 and 29. Each pair of primary fold lines extends generally perpendicularly upwardly along the side walls with respect to the base or bottom wall and with each set of primary fold lines being oriented opposite one another. The fold lines are positioned inwardly from the corners of the box by a substantially equal distance.

Another set of generally parallel fold lines 30 and 31 are provided across the width of the bottom of the box 25 and are aligned with the base of the fold lines 28 and 29, respectively.

A second supplementary set or pair of fold lines are provided along each of the side walls 23 and 24 and are identified by numerals 32 and 33. Each of the supplemental fold lines is shown as extending diagonally outwardly along the sides of the box from adjacent the bottom of the primary fold lines 28 and 29 upwardly to the upper edge of the box at a point which is spaced inwardly from each of the corners of the box. Such diagonal fold lines may be created by perforating the material from which the box is constructed.

The primary and supplemental fold lines therefore divide each of the sides 23 and 24 of the tray into a plurality of separate panels which may be folded relative to one another in a motion which allows the box to be rolled and closed upon itself. Specifically, each of the side walls has a generally central panel portion 35, pairs of adjacent triangular panels 37 and 38 and generally fixed or rigid end panels 39 and 40. The supplemental fold lines 32 and 33 are created so as to permit the central panels 35 to flare outwardly with respect to one another as the ends of the box are raised and drawn into overlapping relationship with respect to one another.

With specific reference to FIG. 3 of the drawings, as the end walls 21 and 22 are initially raised and drawn into closing relationship with respect to one another, each of the central panels 35 of the side walls 23 and 24 is urged outwardly by the bending movement or pivotal movement of the triangular panels 37 and 38 about the diagonal fold lines 32 and 33. In this position, any waste material contained within the tray is trapped between the end walls, the inclined bottom wall end portions 41 and 42, the generally planar central bottom portion 43 and the outwardly flaring portions of each of the side walls 23 and 24. With this configuration, there are no edges of the container being oriented inwardly of the container toward the material that would be enclosed therein. Therefore, there will be no walls or panels associated with the container which would be obstructed by any debris or materials housed within the tray as it is folded.

With specific reference to FIG. 2, as the end wall 21 is brought into underlying relationship with the end wall 22, the triangular side wall sections 37 and 38 will continue to be folded outwardly into generally planar relationship with respect to the fixed end wall sections 39 and 40. In this position, each of the central, end and triangular wall portions of each side wall will be in generally parallel relationship with respect to one another. Therefore, with the box closed as shown in FIG. 1, the ends of the box 50 are formed by each of the individual portions of the side walls in overlapping relationship. Further, it should be noted that the triangular shape presented by the supplemental fold lines in the side walls of the box will insure that the edges created by such fold lines taper at such an angle that only a small edge portion of the side walls would ever engage any material within the tray as the tray is folded into the box configuration.

With the tray fully closed into the box configuration of FIG. 1, a disposable unit is created which may be taped or otherwise sealed for sterile disposal. As shown in FIG. 1, the end wall 22 has become the top wall of the disposable container with the sides 23 and 24 becoming the folded end walls and with the elongated side walls and bottom wall being defined by the three sections of the bottom wall of the tray.

Although it is envisioned that the disposable litter trays of the present invention will normally be made available to the consumer in a preassembled configuration in which an absorbent material such as cat litter will be packaged therein, it is envisioned that some consumers may prefer to create their own containers so as to make use of preferred types of absorbent material, cat litter and the like. In this respect, the disposable container of the present invention may be readily constructed from a preformed sheet material which has been preformed so as to be foldable to the configuration shown in FIG. 4 of the drawings. With specific reference to FIG. 5, a sheet material 60 of cardboard, paper board or similar material as discussed above is shown as having a plurality of fold lines created in the surfaces thereof. For purposes of identification, each of the separate sections between the various fold lines have been identified by the numeral associated with the assembled container as shown in FIG. 4. Generally speaking, the primary shape of the box is created by making two parallel fold lines from one end to the other in the sheet material which are in generally parallel relationship and spaced inwardly from the sides 61 and 62 of the form. The longitudinal fold lines are shown at 63 and 64. The other primary assembly fold lines are shown as extending perpendicularly or transversely to the longitudinal fold lines 63 and 64 and are identified at 65 and 66. The fold lines 65 and 66 will permit the end portions of the blank form to be folded upwardly so as to create the end walls of the tray.

As previously discussed, it is important to insure that no openings are present within the bottom of the tray in which the absorbent material is to be placed. With the form shown in FIG. 5, each of the corners of the form are provided with outwardly extending diagonal fold lines 67 which extend from the intersection of the longitudinal fold lines 63 and 64 with each of the transverse fold lines 65 and 66 outwardly to the corners of the form. Each of the folds 67 may be either made inwardly or outwardly with respect to the sheet material, however, as shown in the embodiment of FIG. 4, the fold lines have been designed to fold inwardly or upwardly with respect to the surface of the form shown in FIG. 5. The remaining fold lines of the form are identified by the numbers which are associated with the assembled tray as shown in FIG. 4.

When it is desired for a consumer to purchase and assemble their own tray or container from a sheet material, the tray configuration is obtained by folding the ends of the blank form about the fold lines 65 and 66 so that the end walls are perpendicular with respect to the bottom wall sections. Thereafter, each of the corner sections of the form may be elevated and folded about the fold lines 67 while simultaneously raising the sides or edges 61 and 62 upwardly so as to be generally perpendicular with respect to the bottom or base sections and pivoting the side wall sections about the longitudinal fold lines 63 and 64. Thereafter, the corner sections are folded inwardly into triangular configurations which are urged against the side or end walls of the box and secured thereto by an appropriate adhesive or tape. In an effort to aid the consumer in constructing the box, a pressure sensitive adhesive may be preapplied as shown for example at H to portions of the corner panels and of the end walls so as to make it possible for the consumer to simply press the folded corner panels into engagement with the end walls. With the box folded as shown in FIG. 4, the consumer may then place any type of absorbent material within the container to a level which is preferably below half of the height of the side and end walls.

With particular reference to FIGS. 6-10, a second embodiment of disposable litter container of the present invention is shown and is identified generally as 20'. As the folding characteristics of the assembled tray 20' are identical to those of the preferred embodiment, each of the respective fold lines disclosed therein are identified by the same numbers as in the primary embodiment with the exception that a prime is added to each number. The configuration of the secondary embodiment not only provides reinforced end walls for the tray but also enables the various folding portions of the box to be mechanically locked or engaged with one another without requiring separate tapes or adhesives to be used in the construction of the tray.

Figure 5:
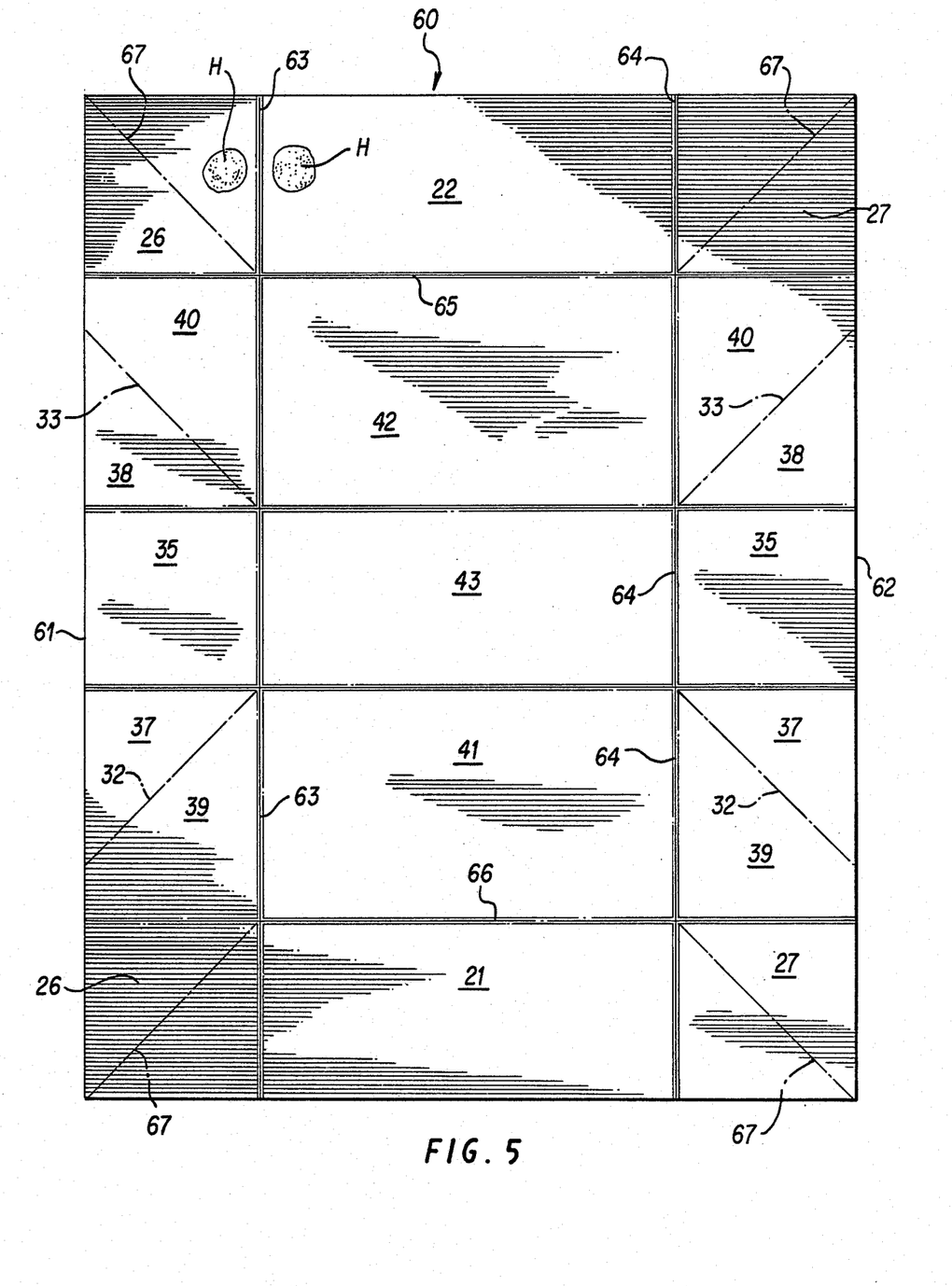
FIG. 5 is a top plan view of the sheet material from which the box configurations of FIGS. 1–4 is constructed.
Figure 6:
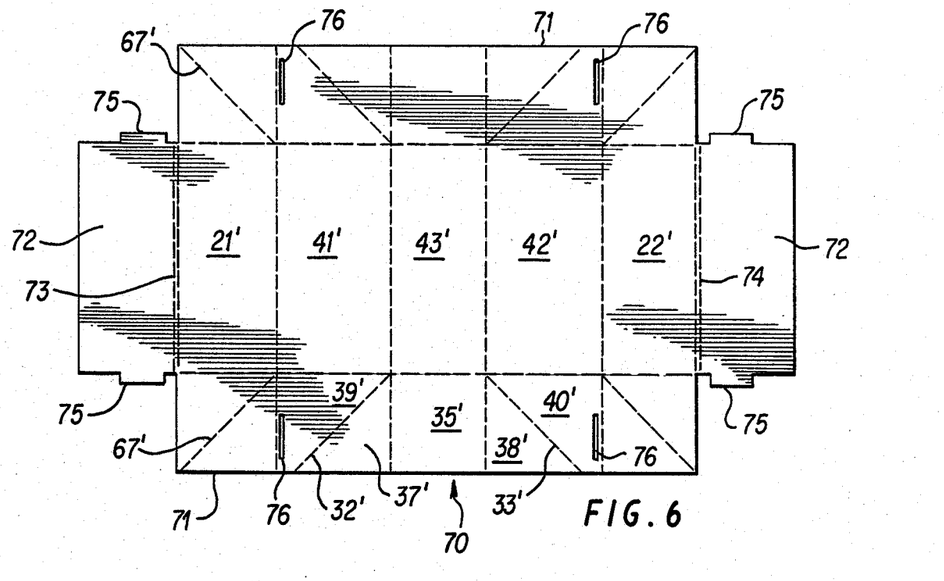
FIG. 6 is a top plan view of a second embodiment of the invention showing reinforcing side wall members extending from the opposite ends of the rectangular form having locking tabs incorporated therewith.

The disposable litter tray 20' is shown as being constructed from a sheet material 70 having a generally rectangular central portion 71 which is generally identical in shape and configuration to the form or sheet material 60 of the preferred embodiment. Again, as the fold lines shown in FIG. 6 of the drawings with respect to the body portion 71 of the blank 70 are the same as shown in FIG. 5 with respect to the preferred embodiment, each of the fold lines and panel sections therein has been identified by a similar character number with a prime being added. Integrally formed adjacent each end of the primary section 71 are outwardly extending reinforcing end wall sections 72. Each of the reinforcing end wall sections 72 are foldable about transverse fold lines 73 and 74 so as to be pivotable with respect to the main portion of the form. A pair of outwardly extending or laterally extending tab portions 75 are provided along the sides of each of the reinforcing end wall portions 72. The tabs 75 are designed to be fitted within slots 76 which are provided within the fixed side wall portions 39 and 40 of each of the sides 23 and 24 of the tray. When the blank of FIG. 6 has been folded, each of the slots 76 will be oriented in a generally vertical orientation as shown in FIG. 7 so that the tabs 75 carried by the reinforcing end walls 72 may be inserted vertically therethrough.

As with the prior embodiment, the main or central portion 71 of the disposable container is formed without openings therein with the exception of the locking slots 76 which are to be eventually positioned in spaced relationship from the bottom of the box or tray when it is in use. The blank form 70 of the present embodiment is initially folded as discussed above with respect to the preferred embodiment so that after the side and end walls have been raised and the corner panels pulled inwardly with respect to one another and pivoted toward each of the end walls, each of tee reinforcing end panels 72 is pivoted about the transverse fold lines 73 and 74 as shown in FIG. 7 and urged into overlying engagement with the reinforcing triangular panel members. As the reinforcing end wall sections 72 are urged toward each of the end walls 21 and 22, the locking tabs 75 will be brought into alignment and extend through the locking slots 76 thereby retaining the reinforcing end wall 72 into locked engagement and retaining the folded end panels in position therebetween.

Figures 7, 8, 9, 10:
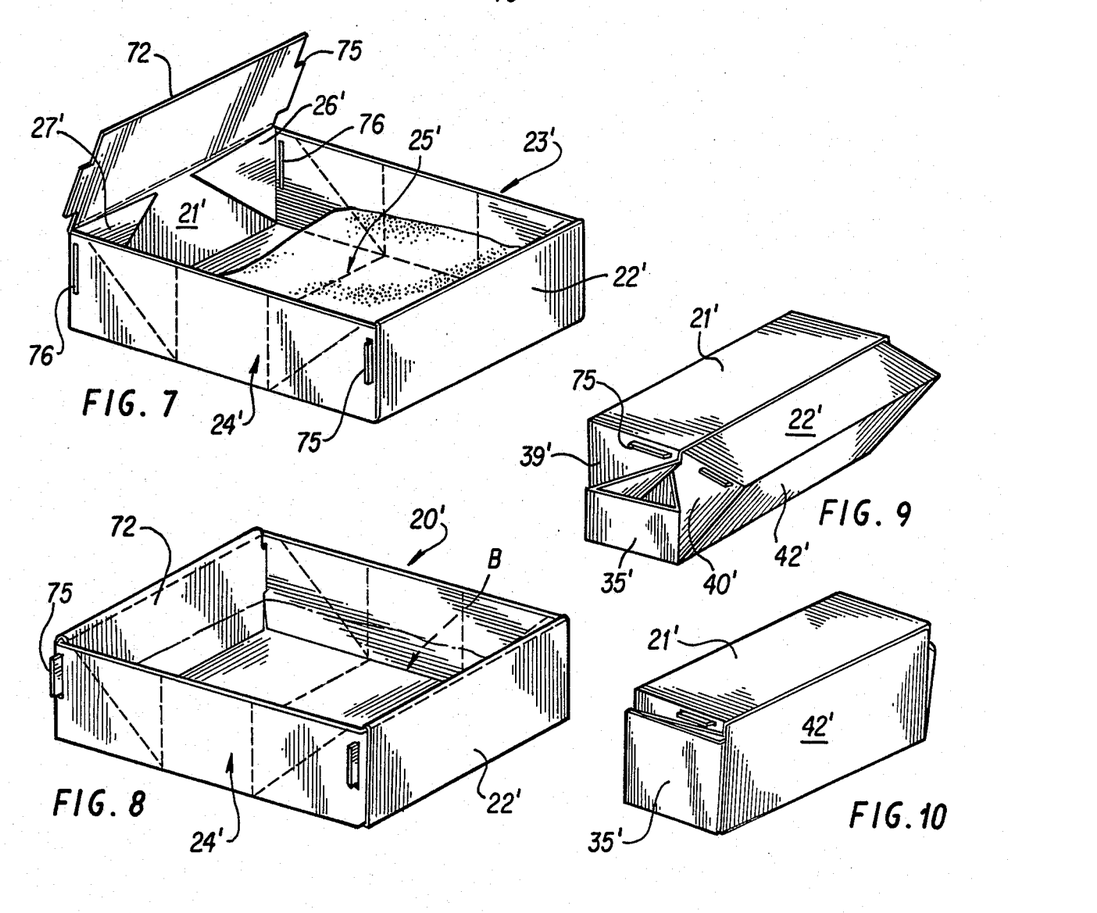
FIG. 7 is a perspective illustrational view showing the blank form of FIG. 6 folded into a tray-like configuration wherein one of the end panels is being brought down into a locking engagement with the side walls.
FIG. 8 is a perspective view of the completed tray assembly of FIG. 7.
FIGS. 9 and 10 are stepwise illustrational views showing the closure of the tray at FIG. 8 as the end walls are brought into overlapping relationship with respect to one another to form an enclosed rectangular box configuration as reflected in FIG. 10.

As opposed to making the container available in the blank form, the second embodiment of the invention may also be sold in an assembled form with a prepackaged bag B of absorbent material or cat litter retained within the box-like configuration shown in FIG. 10 of the drawings. For purposes of example, a prepackaged absorbent material container is illustrated in dotted line in FIG. 7. After the container has been purchased, the consumer need only open the box into the tray configuration shown at FIG. 8 and thereafter remove the particulate or absorbent material from the bag or package depositing it along the floor of the tray. Such a prepackaged material has not been shown in the embodiment of FIGS. 1-5 explicitly for the reason of insuring that the fold lines of the container are shown clearly. It should be emphasized, however, that the container is designed to house a separate package of absorbent material.

We claim:

1. A disposable litter container for waste absorbent material comprising a foldable box which is convertible from a closed configuration to an open tray in which the absorbent material is retained during use, said tray having a bottom, side walls, opposite end walls, and upper edges, each of said side walls having a first pair of fold lines which are vertically oriented and parallel with one another in generally equally spaced relationship to said opposite end walls, said first pair of fold lines extending from the bottom to said upper edges of said tray, a second pair of fold lines extending across said bottom of said tray and between and in general alignment with each of said first pair of fold lines, each of said side walls having a third pair of spaced fold lines extending upwardly and outwardly in opposite directions along said side walls toward said opposite end walls from adjacent said bottom and proximate to said first fold lines to said upper edges of said tray at points spaced adjacent said opposite end walls, said tray being foldable about said second pair of fold lines with said side walls being simultaneously folded generally outwardly relative to said bottom about said first and third pairs of fold lines so as to form said closed configuration of said foldable box wherein the absorbent material is enclosed with said end walls are in overlying relationship with one another.

2. The disposable litter container of claim 1 in which said foldable box is formed from an integral sheet of material having a generally rectangular configuration defined by continuous side and end edges, said sheet material being substantially free of openings therethrough.

3. The disposable litter container of claim 2 in which said sheet material includes a first pair of spaced longitudinal fold lines which are generally equally spaced inwardly of and parallel to said side edges thereof at a first distance and which extend between said end edges of said sheet material, and a first pair of transverse fold lines extending between said side edges of said sheet material and being generally parallel with and spaced inwardly of said end edges at a distance substantially equal to said first distance, each of said transverse fold lines intersecting at spaced points with each of said longitudinal fold lines.

4. The disposable litter container of claim 3 including diagonal fold lines extending from each of said spaced points to the intersection of the adjacent end and side edges of said sheet material.

5. The disposable litter container of claim 4 in which the upper surface of said sheet material is coated with a liquid resistant coating.

6. The disposable litter container of claim 1 in which said foldable box is formed from an integral sheet of material having a generally rectangular central body portion having side edges and opposite ends, a pair of longitudinal fold lines extending between said ends of said central body portion and spaced inwardly of and generally parallel to said side edges, a first pair of transverse fold lines extending across said central body portion of said sheet material between said side edges and extending perpendicularly to said longitudinal fold lines, said first pair of transverse fold lines being generally equally spaced inwardly from each of said ends of said central body portion, a pair of generally rectangular end segments integrally connected at said opposite ends of said central body portion and between said longitudinal fold lines, second transverse fold lines between each of said end segments and said central body portion whereby each of said end segments is foldable into overlying relationship with said central body portion.

7. The disposable litter container of claim 6 including a pair of outwardly extending tab means on opposite sides of each of said end segments, and two pairs of spaced slotted openings through said central body spaced inwardly of and adjacent to each of said first pair of transverse fold lines and between said side edges and said longitudinal fold lines, said tab means being selectively receivable within said slotted openings to retain said end segments in locked overlying engagement with said central body portion.

8. The disposable litter container of claim 7 in which said first pair of transverse fold lines intersect with said longitudinal fold lines at spaced points, diagonal fold lines extending outwardly from each of said spaced points to the adjacent intersection of said ends with said side edges of said central body portion.

9. A transportable and disposable container for housing absorbent material comprising a foldable box which is convertible from a closed configuration to an open tray having upstanding and opposing side and end walls and a bottom wall, said opposing end walls being in overlapping relationship when said foldable box is in a closed configuration, said opposing side walls and said bottom wall being integrally formed from a sheet of material and being joined along lines of intersection therebetween, each of said opposing side walls and said bottom wall having foldable sections, said sections of each of said side walls including a generally central section and a first pair of outer sections, each of said central sections being foldable outwardly with respect to said first outer sections as said tray if folded into said closed configuration, and said first pair of outer sections being generally parallel with said central sections when said side walls are folded to form said closed configuration so that said central sections and said first pair of outer sections of each of said side walls will not be obstructed during folding by any absorbent material within said tray.

10. The transportable and disposable container of claim 9 in which each of said side walls include a second pair of outer sections adjacent each of said end walls, said second pair of outer sections being spaced inwardly and generally parallel to said central section when said tray is folded into said closed configuration.

11. The transportable and disposable container of claim 10 in which said central sections are generally rectilinear in configuration and said first and second pairs of outer sections are generally triangular in configuration.

12. The transportable and disposable container of claim 11 in which said end walls of said tray include two reinforcing layers of said sheet material adjacent each intersection of said end walls with said side walls of said tray.

13. The transportable and disposable container of claim 12 including a second end wall integrally formed with each of said end walls of said tray, said second end walls being foldable with respect to said end walls and over said reinforcing layers so as to retain said reinforcing layers therebetween, tab means carried by each of said second end walls, and slotted openings through each of said side walls of said tray for selectively receiving said tab means therethrough so as to lock said second walls into proximate parallel relation with said end walls of said tray.

14. The transportable and disposable container of claim 12 including means for securing said reinforcing layers to said end walls of said tray.

15. The transportable and disposable container of claim 11 in which said bottom wall includes a generally central section and a pair of outer sections, said central section extending between said central sections of each of said side walls.

16. The transportable and disposable container of claim 9 including a package of absorbent material disposed within said foldable box.

17. The transportable and disposable container of claim 9 including a second end wall integrally formed with each of said end walls of said tray, said second end walls being foldable so as to be parallel with said end walls, tab means carried by each of said second end walls and extending toward said side walls, a slotted opening through each of said side walls adjacent each of said end walls, said tab means being selectively receivable within said slotted openings so as to lock said second end walls to said side walls.

* * * * *